United States Patent

Ikeda (10) Patent No.: US 10,670,426 B2
(45) Date of Patent: Jun. 2, 2020

(54) LINE SENSOR

(71) Applicant: Hitachi Metals, Ltd., Tokyo (JP)

(72) Inventor: Yukio Ikeda, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 336 days.

(21) Appl. No.: 15/639,036

(22) Filed: Jun. 30, 2017

(65) Prior Publication Data

US 2018/0003523 A1  Jan. 4, 2018

(30) Foreign Application Priority Data

Jul. 1, 2016 (JP) .................................. 2016-131941

(51) Int. Cl.
*G01D 5/165* (2006.01)
(52) U.S. Cl.
CPC .................................. *G01D 5/165* (2013.01)
(58) Field of Classification Search
CPC ...................................................... G01D 5/165
USPC .......... 73/763, 767, 768, 774, 818, 862.041,
73/865.8, 432.1; 324/200, 207.11,
324/207.13–207.17, 207.22, 207.24, 691,
324/693, 695, 697, 699, 701, 704, 705,
324/707, 710, 713, 714, 719, 722, 723,
324/71.1; 33/700, 706, 712, 732
See application file for complete search history.

(56) References Cited

U.S. PATENT DOCUMENTS

| | | | |
|---|---|---|---|
| 6,534,999 B2 * | 3/2003 | Brown | G01B 7/18 174/102 SC |
| 8,698,774 B2 | 4/2014 | Mamba et al. | |
| 2009/0102813 A1 | 4/2009 | Mamba et al. | |
| 2012/0182117 A1 | 7/2012 | Tanba et al. | |

FOREIGN PATENT DOCUMENTS

| | | |
|---|---|---|
| EP | 1 580 080 A1 | 9/2005 |
| JP | 2005-096519 A | 4/2005 |
| JP | 2005-306353 A | 11/2005 |
| JP | 3118169 U | 1/2006 |
| JP | 2009-098942 A | 5/2009 |
| JP | 2012-146558 A | 2/2012 |
| JP | 2016-011102 A | 1/2016 |

OTHER PUBLICATIONS

Japanese Office Action, dated Apr. 7, 2020, in Japanese Application No. 2016-131941 and English Translation thereof.

* cited by examiner

*Primary Examiner* — Robert R Raevis
(74) *Attorney, Agent, or Firm* — McGinn I.P. Law Group, PLLC.

(57) ABSTRACT

A line sensor includes a sensor cord including a resilient hollow insulator and two electrical wires arranged along an inner circumferential surface of the hollow insulator in an electrically non-contact state with each other, a constant current source which is connected to one of the two electrode wires at one end of the sensor cord, and a detecting device for detecting a pressed position. The other electric wire is grounded at the other end of the sensor cord. The two electric wires include a resistance wire having a resistance of 1 kΩ/m or more. The detecting device detects a voltage of the resistance wire at one end of the sensor cord to detect the pressed position in a longitudinal direction of the sensor cord based on the detected voltage.

7 Claims, 5 Drawing Sheets

LINE SENSOR

The present application is based on Japanese patent application No. 2016-131941 filed on Jul. 1, 2016, the entire contents of which are incorporated herein by reference.

BACKGROUND OF THE INVENTION

1. Field of the Invention

The present invention relates to a line sensor.

2. Description of the Related Art

In related art, a line sensor, which includes a sensor cord including a resilient hollow insulator and two electrode wires arranged along an inner circumferential surface of the hollow insulator and detects whether the sensor cord is pressed or not by detecting presence or absence of a contact between the two electrode wires, has been generally known.

Herein, the term "sensor cord" means a lengthy sensor unit having a cord-shape or cable-shape, and the term "line sensor" means a sensor apparatus for detecting the pressing on a lengthy sensor unit.

JP-A 2012-146558 proposes a line sensor which uses line-shaped resistors as electrode wires and can detect a position where a sensor cord is pressed based on a variation of a resistance value between both electrode wires. According to the line sensor disclosed in JP-A 2012-146558, it is possible to assign different functions to respective positions where the sensor cord is pressed and thereby it is possible to achieve the same functions as those of a line sensor provided with multiple switches only by using a single sensor cord.

SUMMARY OF THE INVENTION

As a method for measuring a resistance value between both electrode wires, there is e.g., a method for measuring a variation in a current value by applying a predetermined voltage between base end portions (i.e. proximal end portions with respect to a current source) of the electrode wires. The measured current value varies when a resistance value of the sensor cord (a resistance value from a base end of one electrode wire to a base end of the other electrode wire) is varied by pressing an arbitrary position in a longitudinal direction of the sensor cord. Therefore, a pressed position of the sensor cord can be obtained by calculating the resistance value of the sensor cord from the measured current value and an input voltage value. For obtaining a voltage output, it has been generally used a method for measuring a voltage divided into an offset resistor (a voltage on a side of the sensor cord of the offset resistor) by connecting a predetermined resistor (i.e. an offset resistor) to the sensor cord in series.

However, according to the method for measuring the voltage divided into the offset resistor as mentioned above, the relation between the resistance value of the sensor cord (i.e. the pressed position) and the output voltage becomes nonlinear. More specifically, a variation in the output voltage with respect to a variation in the resistance value of the sensor cord becomes small in a region of a tip end side (i.e. distal end with respect to the current source) of the sensor cord where a resistance value becomes large in comparison with a region of a base end side of the sensor cord where a resistance value becomes small. Therefore, the resolution ability decreases towards the tip end side of the sensor cord, so that the detecting accuracy of the pressed position decreases towards the tip end side of the sensor cord.

Accordingly, it is an object of the present invention to provide a line sensor which can detect a pressed position of a sensor cord accurately even when any position of a longitudinal direction of a sensor cord is pressed.

According to one embodiment of the present invention, a line sensor comprises:

a sensor cord comprising a resilient hollow insulator and two electrical wires arranged along an inner circumferential surface of the hollow insulator in an electrically non-contact state with each other;

a constant current source which is connected to one of the two electrode wires at one end of the sensor cord; and a detecting device for detecting a pressed position, wherein the other electric wire is grounded at the other end of the sensor cord, wherein the two electric wires include a resistance wire having a resistance of 1 kΩ/m or more, and wherein the detecting device detects a voltage of the resistance wire at one end of the sensor cord to detect the pressed position in a longitudinal direction of the sensor cord based on the detected voltage.

POINTS OF THE INVENTION

According to the present invention, it is possible to provide a line sensor which can detect a pressed position of a sensor cord accurately even when any position of a longitudinal direction of a sensor cord was pressed.

BRIEF DESCRIPTION OF THE DRAWINGS

Next, the present invention will be explained in conjunction with appended drawings, wherein.

DETAILED DESCRIPTION OF THE EMBODIMENTS

Embodiments

Next, the embodiment according to the present invention will be described below with reference to the appended drawings.

(Descriptions of a Sensor Cord)

Figure 1A:
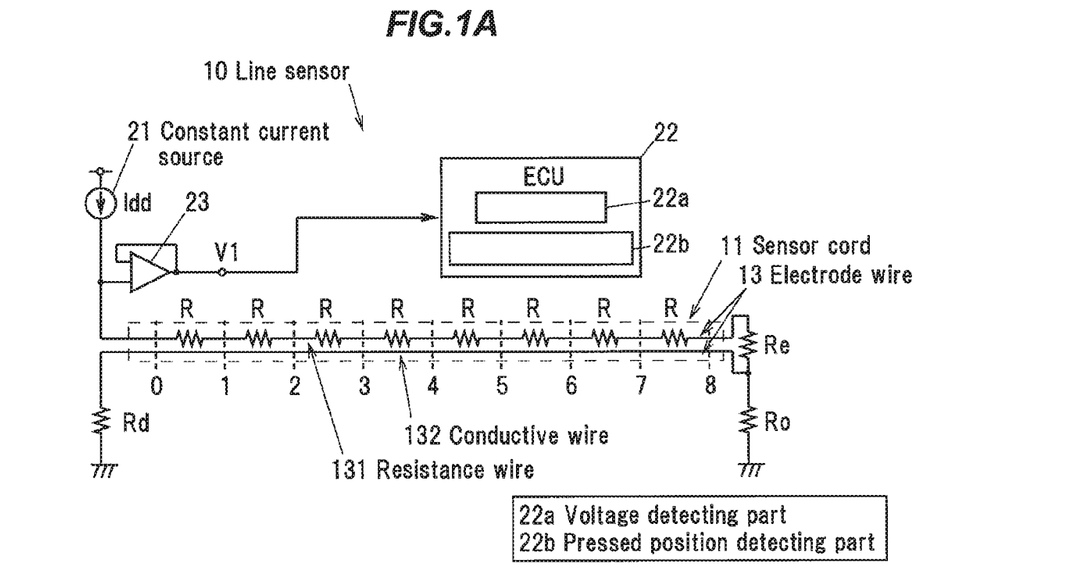
FIG. 1A is a schematic diagram illustrating a line sensor in an embodiment according to the present invention.
Figure 1B:
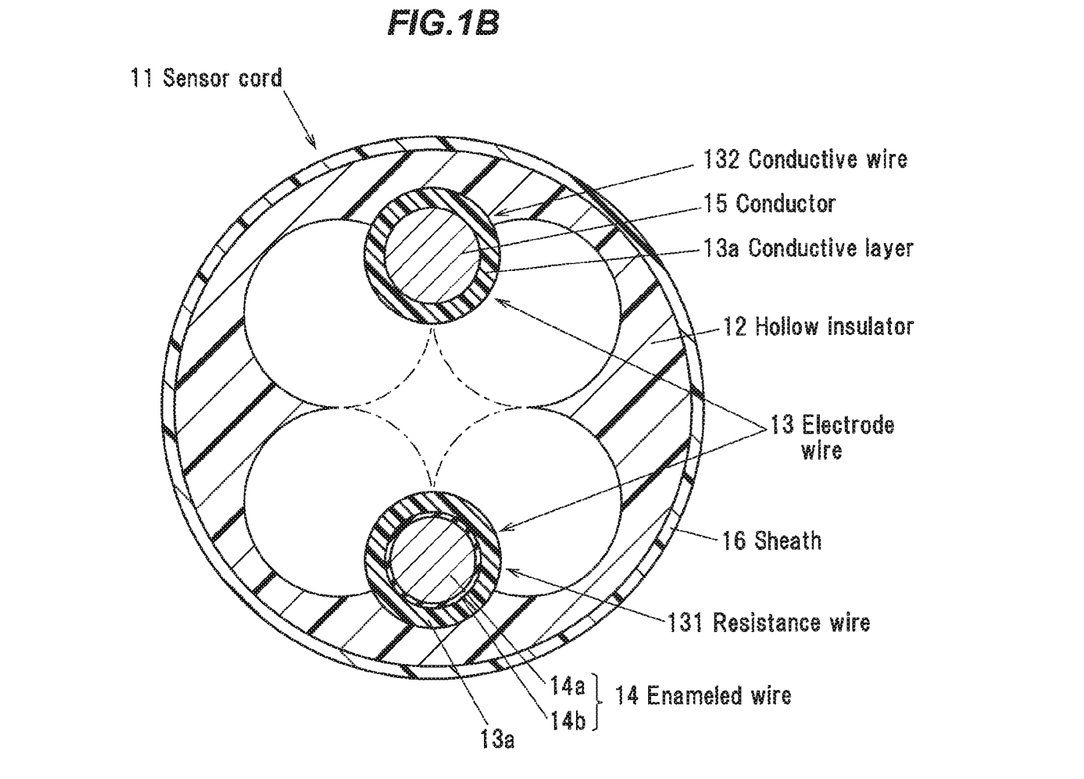
FIG. 1B is a cross sectional view showing a cross section perpendicular to a longitudinal direction of a sensor cord.

FIG. 1A is a schematic diagram illustrating a line sensor in an embodiment according to the present invention, and FIG. 1B is a cross sectional view showing a cross section perpendicular to a longitudinal direction of a sensor cord.

As shown in FIGS. 1A and 1B, a line sensor 10 comprises a sensor cord 11 comprising a resilient hollow insulator 12 and two electrode wires 13 arranged along an inner circumferential surface of the hollow insulator 12 in an electrically non-contact state with each other.

The sensor cord 11 is arranged, e.g., on a steering wheel of an automobile and is used as a control switch of audio equipment, a control switch of an air-conditioner, a cruise control switch, and the like. That is, the line sensor 10 is used as, e.g., a switch device for a steering device of an automobile.

The hollow insulator 12 of the sensor cord 11 is made of resilient rubber or resilient plastic, holds and fixes two electrode wires 13 in a spiral shape in an electrically non-contact state with each other. In addition, the hollow insulator 12 is easily deformed by an external force and is immediately restored after the external force is removed.

As the resilient rubber used for the hollow insulator 12, e.g., urethane rubber, silicone rubber, ethylene-propylene rubber, styrene-butadiene rubber, and chloroprene rubber may be used. As the resilient plastic used for the hollow insulator 12, e.g., polyethylene, ethylene-vinyl acetate copolymer, ethylene-ethyl acrylate copolymer, ethylene-methyl methacrylate copolymer, polypropylene, polyvinyl chloride, and olefin-based or styrene-based thermoplastic elastomer may be used. In addition, engineering plastics such as polyimide, polyamide, and the like may be also used as the resilient plastic, in consideration of the shape and the thickness thereof, as well as the lamination with other materials. The hollow insulator 12 made of silicone rubber is used in this embodiment. A sheath 16 for protecting the hollow insulator 12 is provided on the outer circumferential surface of the hollow insulator 12.

The electrode wire 13 includes a conductive layer 13a as an outermost layer, and the conductive layer 13a is made of a conductive rubber or a conductive plastic. As the conductive rubber or the conductive plastic used for the conductive layer 13a, it is possible to use the resilient rubber or the resilient plastic used for the hollow insulator 12 to which conductive filler, e.g., carbon black is added. The conductive layer 13a made of silicone rubber blended with carbon black is used in this embodiment.

It is preferable that hardness (shore A hardness) of the conductive layer 13a is within a range of not less than 20 and not more than 80. When the hardness (shore A hardness) of the conductive layer 13a is less than 20, the mechanical strength of the conductive layer 13a will deteriorate, which may easily cause the problem such as disconnection. On the other hand, when the hardness (shore A hardness) of the conductive layer 13a is more than 80, the flexibility of the entire sensor cord 11 will deteriorate so that it will be hard to press the sensor cord 11.

In the present embodiment, one of the two electrode wires 13 is composed of a resistance wire 131 having a resistance of 1 kΩ/m or more. In the present embodiment, the pressed position of the sensor cord 11 is detected based on the variation in the resistance value between the end portions of the two electrode wires 13. Therefore, if both of the electrode wires 13 include conductors, the resistance value will become almost the same value even when the sensor cord 11 is pressed at any position, so that it will be difficult to detect the position where the sensor cord 11 is pressed. The details of the above reason will be described later. By using the resistance wire 131 having a resistance of 1 kΩ/m or more for at least one of the two electrode wires 13, the resistance value between the end portions of the two electrode wires 13 varies in accordance with the position where the sensor cord 11 is pressed. Therefore, it is possible to detect the pressed position of the sensor cord 11 based on the variation in the resistance value.

In addition, in the present embodiment, the other of the two electrode wires 13 is composed of a conductive wire 132 having a resistance of 0.1 kΩ/m or less. The resistance (the resistance value per unit length) of the resistance wire 131 is 10000 times or more than the resistance (the resistance value per unit length) of the conductive wire 132.

In the present embodiment, the resistance wire 131 comprises an enameled wire 14 and the conductive layer 13a formed on an outer circumference of the enameled wire 14, while the conductive wire 132 comprises a conductor 15 and the conductive layer 13a formed on an outer circumference of the conductor 15.

The enameled wire 14 is formed by applying an enamel varnish on an outer circumference of a conductor 14a which is made of copper or the like and baking the enamel varnish to form an insulating layer 14b. Although a single enameled wire 14 is used in the present embodiment, but the present invention is not limited thereto. The resistance wire 131 may be formed by twisting (stranding) a plurality of (e.g., seven) small diameter enamel wires 14 and forming the conductive layer 13a by extrusion coating around the twisted enamel wires 14. In the resistance wire 131, the conductor 14a of the enameled wire 14 and the conductive layer 13a are electrically insulated from each other.

In addition, in the present embodiment, the conductive wire 132 is formed by forming a conductive layer 13a by extrusion coating around the conductor 15 which is formed by twisting (stranding) a plurality of (e.g., seven) element wires made of copper or the like. In the conductive wire 132, the conductor 15 and the conductive layer 13a are electrically conducted to each other.

However, the specific structure of the two electrode wires 13 is not limited thereto. For example, the resistance wire 131 may be consisted of the conductive layer 13a. Moreover, it is also possible to use a fibrous member made of an insulator such as a glass fiber, a cotton thread, a carbon fiber, super engineering plastics such as polyphenylene sulfide, instead of the enameled wire 14 in the resistance wire 131. However, if the resistance wire 131 is consisted of the conductive layer 13a, it will be difficult to lengthen the resistance wire 131 because of the low strength of the conductive rubber or the conductive plastic constituting the conductive layer 13a. For example, it will be difficult to form a lengthy sensor cord 11 and cut it into a desired length, which may reduce mass productivity. Therefore, from the viewpoint of enabling the elongation and improving the mass productivity, it is preferable that the conductive layer 13a is provided around the core material such as the enameled wire 14, the conductor 15, or the fibrous member.

In addition, when a fibrous member made of an insulator is used as the core material, a difference may occur in bending characteristics between the resistance wire 131 using the fibrous member and the conductive wire 132 using the conductor 15. As a result, there may be a direction in which the sensor cord 11 is hard to be bended, or there may be a difference in detection accuracy in the longitudinal direction of the sensor cord 11. Therefore, when the conductive wire 132 is used as one of the electrode wires 13, it is more preferable to use the enameled wire 14 as the core material of the resistance wire 131 which is the other electrode wire 13, so as not to occur the difference in bending characteristic between the two electrode wires 13.

By the way, when the sensor cord 11 is provided on the steering wheel, it is sometimes required to reduce the diameter of the enameled wire 14 in order to improve a feeling when the driver touches the sensor cord 11 with his hand. However, if the diameter of the enameled wire 14 is reduced, the enameled wire 14 may break by a load at the time of manufacturing so that it may be difficult to manufacture the sensor cord 11.

Therefore, when the feeling of the sensor cord 11 is required as described above, it is preferable to use a tension member having elasticity and high tensile strength as the core material. As the tension member, for example, a resin material such as nylon sling can be used. By using the resin material such as the nylon sling and etc., the feeling of the sensor cord 11 can be improved. In the present embodiment, it has been described in such a case that one of the electrode wires 13 is the resistance wire 131 and the other is the conductive wire 132, but the present invention is not limited thereto. When both of the electrode wires 13 are the resistance wires 131 (see FIG. 5A), each of both the resistance wires 131 may comprise the conductive layer 13a around the tension member made of resin such as a nylon sling.

The two electrode wires 13 (the resistance wire 131 and the conductive wire 132) are arranged spirally along the inner circumferential surface of the hollow insulator 12. For example, in the case of arranging the sensor cord 11 on the steering wheel, when the sensor cord 11 is pressed with a finger, for example, a winding pitch for spirally winding the electrode wire 13 is preferably 10 mm or less, more preferably 5 mm or less. Here, the winding pitch of the electrode wire 13 refers to a distance along the longitudinal direction from an arbitrary position in a circumferential direction of an inner surface of the hollow insulator 12 until the same position in the circumferential direction to which the electrode wire 13 wound in one turn along the inner surface of the hollow insulator 12 returns. Namely, the winding pitch means an interval along the longitudinal direction of an arbitrary electrode wire 13 at an arbitrary position in the circumferential direction.

The sensor cord 11 is manufactured by twisting the two electrode wires 13 and four dummy wires, forming the hollow insulator 12 and the sheath 16 around the twisted wires by extrusion coating, and then drawing out and removing the dummy wires. Therefore, on the inner circumferential surface of the hollow insulator 12, protruding portions that protrude radially inward (portions that have entered valley portions between the adjacent dummy wires) are left spirally. Here, the number of the dummy wires is not limited to four.

(Descriptions of the Line Sensor 10)

As shown in FIG. 1A, the line sensor 10 is provided with a constant current source 21 connected to one electrode wire 13 at one end of the sensor cord 11, and the other electrode wire 13 is grounded at the other end of the sensor cord 11. In the present embodiment, the constant current source 21 is connected to one end of the resistance wire 131, and the other end of the conductive wire 132 is grounded.

In addition, the line sensor 10 further comprises an ECU (Electronic control unit) 22 as a detection device, which detects voltage V1 of the resistance wire 131 at one end of the sensor cord 11, and detects the pressed position in the longitudinal direction of the sensor cord 11 based on the detected voltage V1.

In the present embodiment, a resistance value of the entire resistance wire 131 (from one end to the other end) is set to 10 kΩ and a current value Idd of the constant current source 21 is set to 400 μA. FIG. 1A shows, as an example, a case where the pressed positions of the sensor cord 11 are set at nine locations equally spaced from the base end (one end on the connection side of the constant current source 21) to the tip end (the other end) of the sensor cord 11. The numbers 0 to 8 in FIG. 1A represent the pressed positions, and a resistance value of each of the resistance wire 131 between the pressed positions is assumed to be a constant value R (=10 kΩ/8). Further, the base end of the sensor cord 11 is set to the 0th pressed position, the tip end of the sensor cord 11 is set to the 8th pressed position, and the numbers of the pressed positions between the 0th and 8th pressed positions are sequentially set from 1th to 7th from the base end side to the tip end side.

One end of the resistance wire 131 and the ECU 22 are connected via a buffer amplifier 23. The buffer amplifier 23 plays a role of suppressing the entry of a current from the constant current source 21 into the ECU 22 due to its high input-impedance. In the present embodiment, the buffer amplifier 23 comprises a voltage follower connecting an output of the operation amplifier and one input (V-terminal).

In the present embodiment, at the other end of the sensor cord 11, the other electrode wire 13 (the electrode wire 13 on the side to which the constant current source 21 is not connected, namely the conductive wire 132 in the present embodiment) is grounded via an offset resistor Ro. The offset resistor Ro plays a role of suppressing the constant current source 21 from being grounded via the conductive wire 132 to be in a short-circuit state when the base end portion of the sensor cord 11 (the 0th pressed position in the drawing) is pressed. In the case where the electrode wires 13 include the conductive wire 132, it is necessary to connect the offset resistor Ro in order to suppress the short circuit. Here, the resistance value of the offset resistor Ro is set to 1 kΩ.

Further, in the present embodiment, the two electrode wires 13 are electrically connected via a terminating resistor (terminator) Re at the other end of the sensor cord 11. By electrically connecting the other ends of the two electrode wires 13 via the terminating resistor Re, a current from the constant current source 21 is guided to the ground when the sensor cord 11 is not pressed, and therefore it is possible to suppress the entry of the current from the constant current source 21 into the ECU 22. If the other ends of the two electrode wires 13 are directly connected to each other without any intervention of the terminating resistor Re, the voltage V1 will be the same both in the case where the other end portion of the sensor cord 11 (the 8th pressed position in the drawing) is pressed and in the case where the sensor cord 11 are not pressed. As a result, it is not possible to determine as to whether the sensor cord 11 is pressed or not. Therefore, by connecting the other ends of the two electrode wires 13 via the terminating resistor Re, the voltage V1 varies when the other end portion of the sensor cord 11 is pressed, so that it is possible to determine as to whether the sensor cord 11 is pressed or not.

It is preferable that a resistance value of the terminating resistor Re is set to a sufficiently high value as compared with a resistance value of the offset resistor Ro in order to suppress a current from flowing to the terminating resistor Re-side when the sensor cord 11 is pressed. In particular, it is preferable that the resistance value of the terminating resistor Re is 10 times or more than that of the offset resistor Ro. In the present embodiment, the resistance value of the terminating resistor Re is set to 10 kΩ.

Furthermore, in the present embodiment, the conductive wire 132 is grounded via a resistor Rd at one end of the sensor cord 11. In order to suppress a current from flowing to the resistor Rd-side when the sensor cord 11 is pressed, a resistance value of the resistor Rd is preferably 10 times or more, more preferably 100 times or more than the sum of the resistance value of the electrode wire 13 (in this case, the conductive wire 132) to which the resistance Rd is connected and a resistance value (here, the resistance value of the offset resistor Ro) between the other end of the conductor 13 (conductive wire 132) and the ground. In the present embodiment, the resistance value of the resistor Rd is set to 1 MΩ. By grounding the other end of the conductive wire 132 via the resistor Rd, it becomes possible to stabilize the potential of the conductive wire 132 at one end of the sensor cord 11, so that it becomes possible to measure the stable voltage V1 when the sensor cord 11 is pressed. Further, by grounding the other end of the conductive wire 132 via the resistor Rd, even when, e.g., the disconnection occurs in a path which is grounded from the other end of the conductive wire 132 via the offset resistor Ro, it is possible to secure a current path from the constant current source 21 through one end of the conductive wire 132 to the ground and to suppress the inrush current to the ECU 22.

The ECU 22 as the detection device is mounted with a voltage detecting part 22a for detecting the voltage V1 and a pressed position detecting part 22b for detecting the pressed position in the longitudinal direction of the sensor cord 11 based on the voltage detected by the voltage detecting part 22a. The voltage detecting part 22a and the pressed position detecting part 22b are realized by appropriately combining a CPU, a memory, an interface, and software.

In the present embodiment, assuming that the number of the pressed positions (which is the number from 0 to 8 shown in FIG. 1A) is n, the voltage V1 outputted when the sensor cord 11 is pressed at the nth pressed position is expressed by a following formula (1):

$$V1 = (nR + Ro) \times Idd \quad (1).$$

Based on the voltage V1 detected by the voltage detecting part 22a, the pressed position detecting part 22b detects the pressed position n by a following formula (2):

$$n = \{(V1/Idd) - Ro\}/R \quad (2).$$

Figure 2:
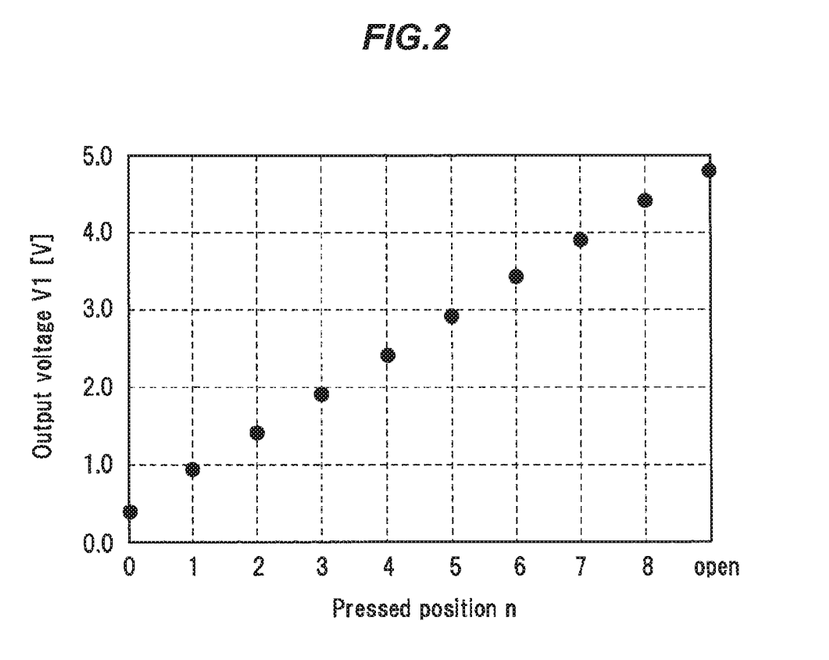
FIG. 2 is a graph showing a relation between an output-voltage and a pressed position in a line sensor shown in FIG. 1A.

FIG. 2 shows a relation between the voltage (output voltage) V1 and the pressed position n in the line sensor 10. As shown in FIG. 2, the relation between the voltage V1 and pressed position n is linear. As a result of examination by the inventors of the present invention, it was confirmed that the linearity error is as good as 0.1% or less in the present embodiment.

Figure 3A:
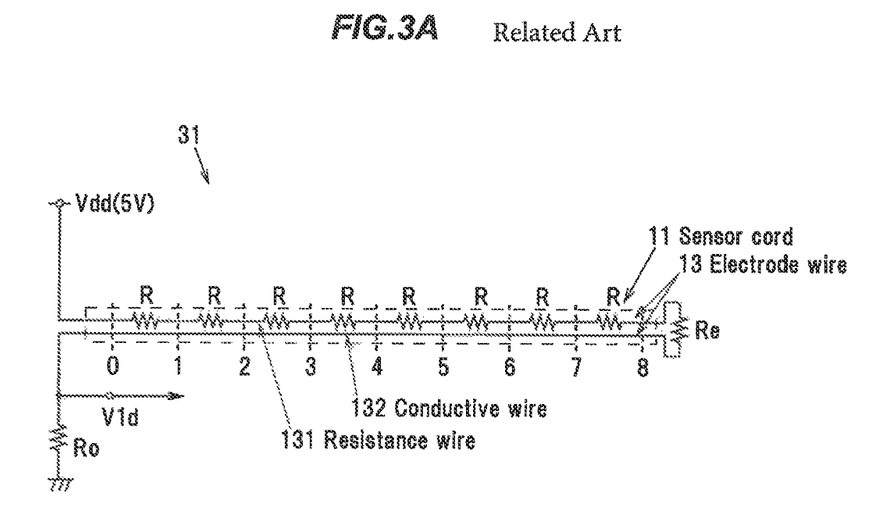
FIG. 3A is a schematic diagram illustrating a related art line sensor.

Here, for comparison with the present embodiment, a related art line sensor 31 shown in FIG. 3A will be examined. As shown in FIG. 3A, a sensor cord 11 using a resistance wire 131 as one electrode wire 13 and a conductive wire 132 as the other electrode wire 13 is used in the related art line sensor 31. In the related art line sensor 31, the other ends of the resistance wire 131 and the conductive wire 132 are electrically connected to each other via the terminating resistor Re (10 kΩ), and a voltage Vdd of 5V is applied at one end of the resistance wire 131 by a constant voltage source, and one end of the conductive wire 132 is grounded via the offset resistor Ro (1 kΩ).

In this related art line sensor 31, voltage V1d, which is divided into the offset resistor Ro when the nth pressed position is pressed, is expressed by a following formula (3):

$$V1d = \{Ro/(nR + Ro)\} \times Vdd \quad (3).$$

Figure 3B:
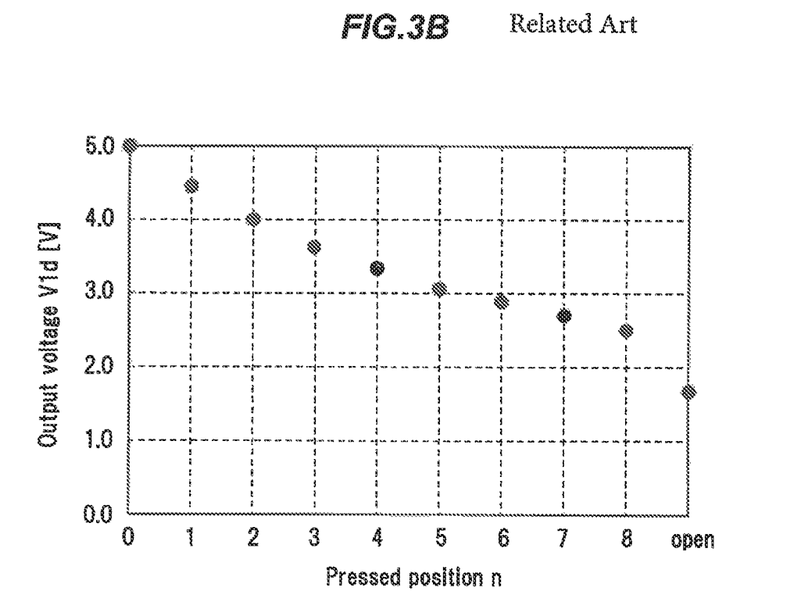
FIG. 3B is a graph showing a relation between an output-voltage and a pressed position of the related art line sensor.

FIG. 3B shows a relation between the voltage V1d and the pressed position n in the related art line sensor 31. As shown in FIG. 3B, in the related art line sensor 31, the relation between the voltage V1d and the pressed position n is nonlinear, and the variation in the voltage V1 with respect to the variation in the resistance value R is small in a region where the resistance value R is large so that the resolution ability (the detection accuracy of the pressed position) will be deteriorated. On the other hand, in the line sensor 10 according to the present embodiment, the relation between the voltage V1 and the pressed position n is linear as shown in FIG. 2, so that it is possible to suppress such a reduction in resolution ability and therefore it is possible to accurately detect the pressed position of the sensor cord 11 even when any position in the longitudinal direction of the sensor cord 11 is pressed.

(Variations of the Present Invention)

Figure 4A:
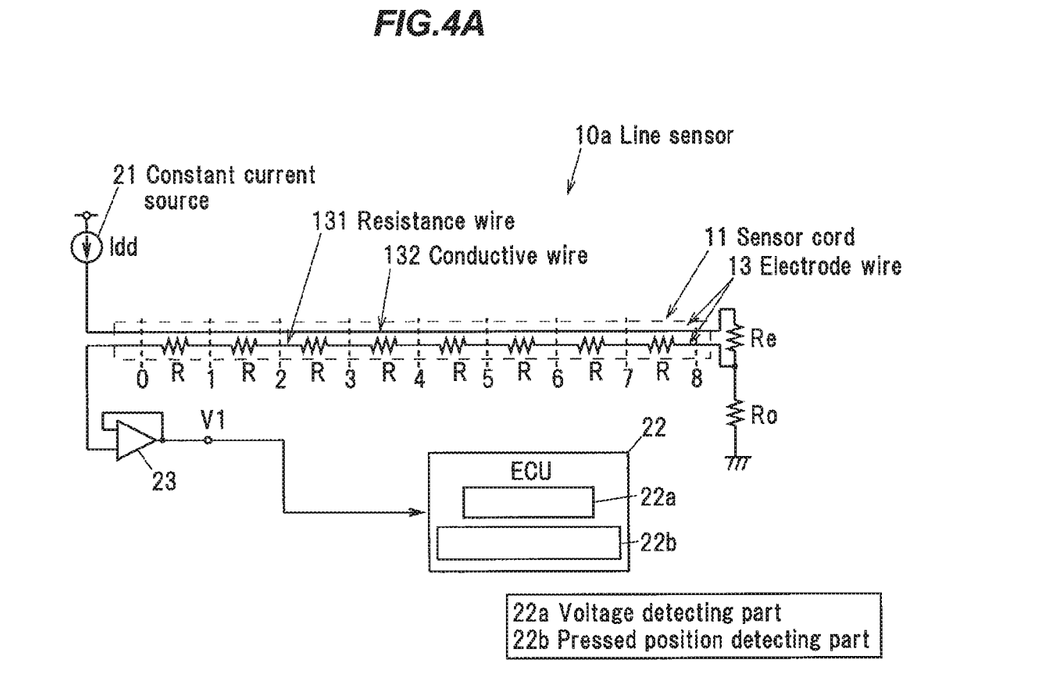
FIGS. 4A and 4B are schematic diagrams illustrating variations of a line sensor shown in FIG. 1A.

FIG. 4A shows a line sensor 10a configured in such manner that the constant current source 21 is connected to one end of the conductive wire 132 and the other end of the resistance wire 131 is grounded via the offset resistor Ro, so as to measure the voltage V1 at one end of the resistance wire 131. In the line sensor 10a, the other ends of the conductive wire 132 and the resistance wire 131 are connected to each other via the terminating resistor Re. In addition, the buffer amplifier 23 is provided between one end of the resistance wire 131 and the ECU22 as a detecting device.

In the line sensor 10a, assuming that the number of resistor R between pressed positions is N (here, 8), the voltage V1 output to the ECU 22 when the nth pressed position is pressed is expressed by the following formula (4):

$$V1 = \{(N-n)R + Ro\} \times Idd \quad (4).$$

Thus, the pressed position detecting part 22b detects the pressed position n by the following formula (5):

$$n = N - \{(V1/Idd) - Ro\}/R \quad (5).$$

Figure 4B:
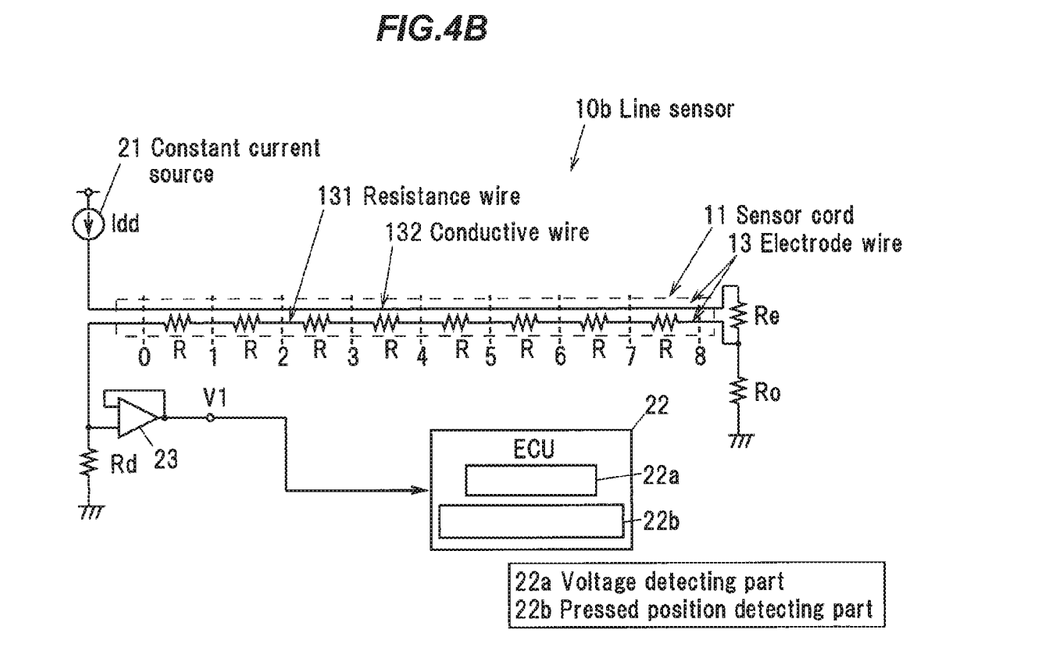

FIG. 4B shows a line sensor 10b configured in such a manner that one end of the resistance wire 131 is further grounded via the resistor Rd having a sufficiently large resistance value in the line sensor 10a shown in FIG. 4A. In order to prevent the current from flowing to the resistor Rd-side when pressing the sensor cord 11, the resistance value of the resistor Rd is preferably 10 times or more, more preferably 100 times or more than the sum of the resistance value N×R that is the resistance value of the electrode wire 13 (i.e. the resistance wire 131) to which the resistor Rd is connected and the resistance value (i.e. the resistance value of the offset resistor Ro) between the other end of the electrode wire 13 (i.e. the resistance wire 131) and the ground, that is, (N×R+Ro). By grounding one end of the resistance wire 131 via the resistor Rd, for example, even when the disconnection occurs between a path from the other end of the conductive wire 132 to the ground via the offset resistor Ro, it is possible to secure a current path from the constant current source 21 to the ground via one end of the conductive wire 132, and it is possible to suppress the inrush current to the ECU 22.

Function and Effect of the Present Embodiment

As described above, the line sensor 10 comprises the sensor cord 11 comprising the resilient hollow insulator 12 and two electrical wires 13 arranged along the inner circumferential surface of the hollow insulator 12 in an electrically non-contact state, the constant current source 21 connected to one of the two electrode wires 13 at one end of the sensor cord 11, in which the other electric wire 13 is grounded at the other end of the sensor cord 11, and the two electric wires 13 include the resistance wire 131 having a resistance value of 1 kΩ/m or more, and the line sensor 10 further comprises the ECU 22a as a detecting device which detects the voltage V1 of the resistance wire 131 at one end of the sensor cord 11 and detects the pressed position n in the longitudinal direction of the sensor cord 11 based on the detected voltage V1.

By constituting the line sensor 10 as mentioned above, the relation between the voltage V1 and the pressed position n (the resistance value of the sensor cord 11) becomes linear, and therefore it is possible to accurately detect the pressed position n of the sensor cord 11 even when any position in the longitudinal direction of the sensor cord 11 is pressed. That is, according the line sensor 10, it is possible to suppress an erroneous detection of the pressed position n.

In addition, according to the line sensor 10, it is possible to guide the current from the constant current source 21 to the ground and to suppress the inrush current from the current source 21 into the ECU 22 because two electrode wires 13 are electrically connected to each other at the other end of the sensor cord 11 via the terminating resistor Re.

Moreover, according to the line sensor 10, the electrode wire 13 which is not connected to the constant current source 21 is grounded at one end of the sensor cord 11 via a resistor Rd which has a resistance value of 10 times or more than the sum of the resistance value of the electrode wire 13 and the resistance value between the other end of other electrode wire 13 and the ground. Therefore, it is possible to secure a current path from the constant current source 21 to the ground and to suppress the inrush current to the ECU 22 even when the disconnection occurs between the current path from the other end of the electrode wire 13 to the ground via the offset resistor Ro.

Furthermore, according to the line sensor 10, it is possible to suppress the inrush current into the ECU 22 because the resistance wire 131 and the ECU22 as the detecting device are connected to each other via the buffer amplifier 23.

Furthermore, according to the line sensor 10, the two electrode wires 13 include the conductive wire 132 having the resistance of 0.1 Ω/m or less, and the electrode wire 13 which is not connected to the constant current source 21 is grounded at the other end of the sensor cord 11 via the offset resistor Ro. Therefore, it is possible to suppress the short-circuit in which the constant current source 21 is directly connected to the ground via the conductive wire 132, even when the base end portion (the 0th pressed position) of the sensor cord 11 is pressed.

Another Embodiment

Figure 5A:
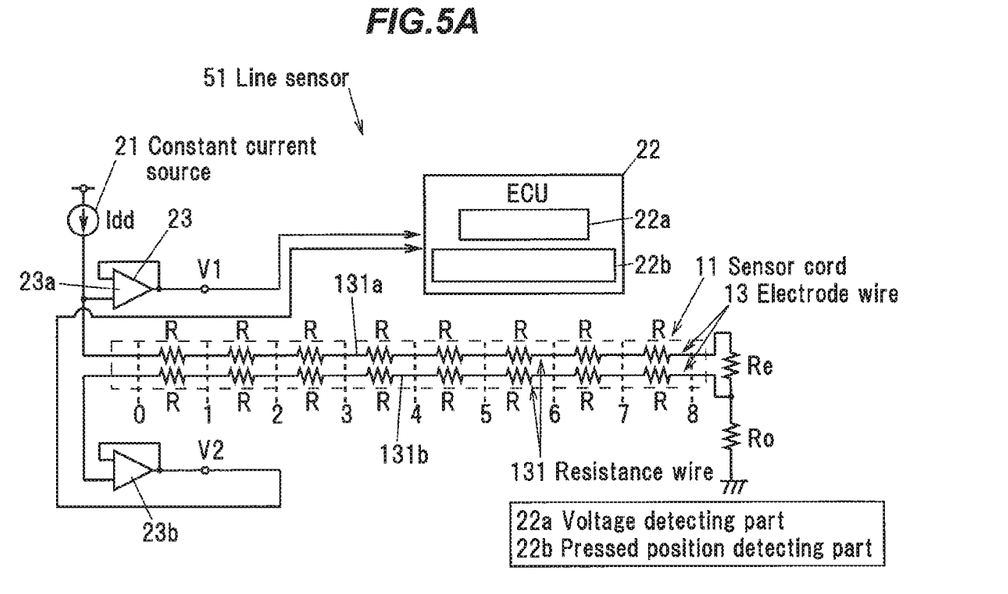
FIG. 5A is a schematic diagram illustrating a line sensor in another embodiment according to the present invention.

FIG. 5A is a schematic diagram illustrating a line sensor in anther embodiment of the present invention.

As shown in FIG. 5A, a line sensor 51 is configured in such a manner that both the two electrode wires 13 are the resistance wires 131 each having the resistance of 1 kΩ/m or more, the ECU 22 as the detecting device detects voltages V1 and V2 of the two resistance wires 131 at one end of the sensor cord 11, and the pressed position n in the longitudinal direction of the sensor cord 11 is detected based on the detected voltages V1 and V2.

Hereinafter, one resistance wire 131 which is connected to the constant current source 21 is referred to as a first resistance wire 131a, and the other resistance wire 131 which is not connected to the constant current source 21 is referred to as a second resistance wire 131b.

The constant current source 21 is connected to one end of the first resistance wire 131a, and the one end of the first resistance wire 131a is connected to the ECU 22 via a first buffer amplifier 23a. The other ends of both resistance wires 131a and 131b are connected to each other via the terminating resistor Re.

In addition, one end of the second resistance wire 131b is connected to the ECU 22 via a second buffer amplifier 23b. The other end of the second resistance wire 131b is grounded via the offset resistor Ro. Although not shown in FIG. 5A, the one end of the second resistance wire 131b may be grounded via the resistor Rd having a resistance value of 10 times or more (preferably 100 times or more) than the sum of the resistance value (N×R+Ro) of a resistance value of the second resistance wire 131 and a resistance value of the offset resistor Ro.

Figure 5B:
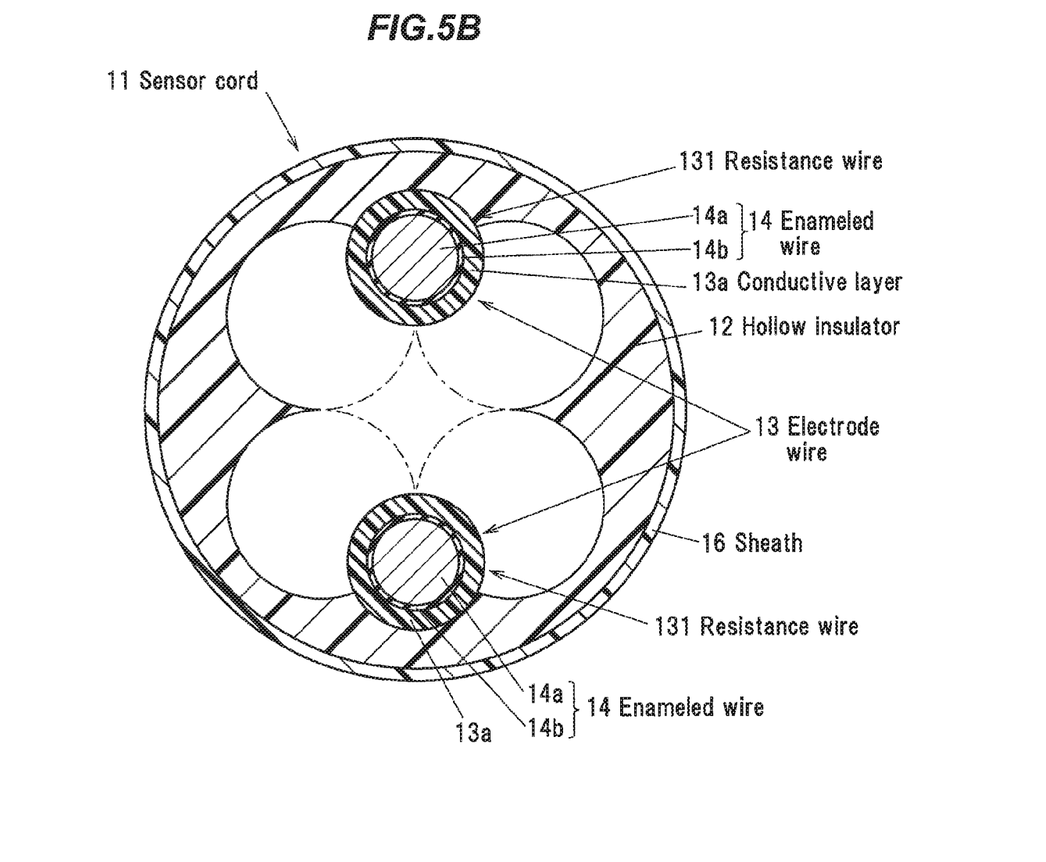
FIG. 5B is a cross sectional view showing a cross section perpendicular to a longitudinal direction of a sensor cord.

As shown in FIG. 5B, in the line sensor 51, the sensor cord 11 may be configured in such a manner that each of both the electrode wires 13 (resistance wires 131a and 131b) comprises the conductive layer 13a formed around the enameled wire 14. However, the present invention is not limited thereto. Each of the both electrode wires 13 (resistance wires 131a and 131b) may comprise a tension member made of resin such as a nylon sling as a core material and the conductive layer 13a provided around the tension member. According to this configuration, the diameter of the electrode wire 13 can be further reduced as compared with the case of using the enameled wire 14 as the core material, and therefore the diameter of the sensor cord 11 can be further reduced.

In the line sensor 51, it is necessary to use the resistance wires having the same resistance values per unit length as the both resistance wires 131a and 131b. However, the resistance values per unit length of both resistance wires 131a and 131b need not be strictly the same, and some margins are tolerated. In particular, it is preferable that the difference between the resistance values per unit length of the both resistance wires 131a and 131b is 10% or less of the resistance value per unit length of the resistance wire 131 having a larger resistance value.

In the line sensor 51, a voltage detecting part 22a detects a voltage V1 at one end of the first resistance wire 131a and detects a voltage V2 at one end of the second resistance wire 131b. In the line sensor 51, by calculating the pressed position n using these two voltages V1 and V2, it is possible to suppress the influence of the temperature characteristic of the resistance wire 131 so that it is possible to accurately detect the pressed position n of the sensor cord 11 regardless of the temperature variation.

For example, when the line sensor 51 is used as a switch device for a steering equipment, the sensor cord 11 is placed in a passenger compartment of au automobile with a large temperature variation. In such a case, it is particularly effective to enable the accurate detection of the pressed position n on the sensor cord regardless of the temperature variation.

In the line sensor 51, the voltage V1 is the same value regardless of the pressed position on the sensor cord 11, and is represented by a following formula (6):

$$V1 = (NR+Ro) \times Idd \qquad (6).$$

Assuming that the temperature of the sensor cord 11 is T, the temperature coefficient of the sensor cord 11 is α, the temperature of the offset resistor Ro is To, the temperature coefficient of the offset resistor Ro is αo, and considering the variation of the resistance value due to the temperature variation in the formula (6), a following formula (7) is obtained:

$$V1 = \{NR(1+\alpha T) + Ro(1+\alpha o To)\} \times Idd \quad (7).$$

In the formula (7), assuming that $1 \gg \alpha o To$, the relationship of a following formula (8) is obtained:

$$1 + \alpha T = (V1/I - Ro)/(NR) \quad (8).$$

Similarly, the voltage V2 when the nth pressed position is pressed is represented by a following formula (9):

$$V2 = \{(N-n)R(1+\alpha T) + Ro(1+\alpha o To)\} \times Idd \quad (9).$$

Assuming that $1 \gg \alpha o To$ in the formula (9) and substituting the relationship of the formula (8) in the formula (9), a following formula (10) is obtained:

$$n = \{1 - (V2 - Ro \cdot Idd)/(V1 - Ro \cdot Idd)\} \times N \quad (10).$$

As shown in the formula (10), according to the line sensor 51, it is possible to calculate the pressed position n without being affected by the temperature T. In the line sensor 51, the pressed position detecting part 22b calculates the pressed position n according to the formula (10).

As explained above, in the line sensor 51, both the two electrode wires 13 are the resistance wires 131 each having resistance of 1 kΩ/m or more, the ECU 22 as the detecting device detects the voltages V1 and V2 of the two resistance wires 131 respectively at one end of the sensor cord 11, and the pressed position n in the longitudinal direction of the sensor cord 11 is detected based on the detected voltages V1 and V2. According to this configuration, the pressed position n of the sensor cord 11 can be accurately detected regardless of the temperature variation.

Summary of the Embodiments

Next, technical ideas understood from the embodiments as described above will be described below with using the reference numerals, etc., used in the description of the embodiments. However, each reference numeral, etc., described below is not intended to limit the constituent elements in the claims to the members, etc., specifically described in the embodiments.

[1] A line sensor (10), comprising:
a sensor cord (11) comprising a resilient hollow insulator (12) and two electrical wires (13) arranged along an inner circumferential surface of the hollow insulator (12) in an electrically non-contact state with each other;
a constant current source (21) which is connected to one of the two electrode wires (13) at one end of the sensor cord (11); and
a detecting device (22) for detecting a pressed position,
wherein the other electric wire (13) is grounded at the other end of the sensor cord (11),
wherein the two electric wires (13) include a resistance wire (131) having a resistance of 1 kΩ/m or more, and
wherein the detecting device (22) detects a voltage of the resistance wire (131) at one end of the sensor cord (11) to detect the pressed position in a longitudinal direction of the sensor cord (11) based on the detected voltage.

[2] The line sensor (10) according to [1], wherein the two electrode wires (13) are connected to each other at the other end of the sensor cord (11) via a terminating resistor (Re).

[3] The line sensor (10) according to [1] or [2], wherein the other electrode wire (13) is grounded at the one end of the sensor cord (11) via a resistor (Rd) which has a resistance value of 10 times or more than the sum of a resistance value of the other electrode wire (13) and a resistance value between the other end of the other electrode wire (13) and the ground.

[4] The line sensor (10) according to any one of [1] to [3], wherein the resistance wire (131) and the detecting device (22) are connected to each other via a buffer amplifier (23).

[5] The line sensor (10) according to any one of [1] to [4], wherein the two electrode wires (13) include a conductive wire (132) having a resistance of 0.1 Ω/m or less, and wherein the other electrode wire (13) is grounded at the other end of the sensor cord (11) via an offset resistor (Ro).

[6] The line sensor (51) according to any one of [1] to [4], wherein both the two electrode wires (13) comprise the resistance wires (131) each having a resistance of 1 kΩ/m or more, and wherein the detecting device (22) detects the voltages of the two resistance wires (131) respectively at the one end of the sensor cord (11) to detect the pressed position in the longitudinal direction of the sensor cord (11) based on the detected voltages.

[7] The line sensor (51) according to [6], wherein each of both the resistance wires (13) comprises a tension member comprising resin, and a conductive layer (13a) provided on an outer circumference of the tension member and comprising conductive rubber or conductive plastic.

Although, the embodiments of the invention have been described, the invention is not to be limited to the embodiments. Meanwhile, it should be noted that all combinations of the features described in the embodiments are not necessary to solve the problem of the invention.

Also, the various kinds of modifications can be implemented without departing from the gist of the invention. For example, in the above-described embodiments, the case where the line sensors 10, 51 are used as the switch device for a steering equipment has been described, but the application use of the line sensors 10, 51 is not limited thereto.

What is claimed is:

1. A line sensor, comprising:
a sensor cord comprising a resilient hollow insulator and two electrode wires arranged along an inner circumferential surface of the hollow insulator in an electrically non-contact state with each other,
a constant current source which is connected to one of the two electrode wires at one end of the sensor cord; and
a detecting device,
wherein an other one of the two electrode wires is grounded at an other end of the sensor cord via an offset resistor,
wherein at least one of the two electrode wires includes a resistance wire having a resistance of 1 kΩ/m or more, and
wherein the detecting device detects a voltage of the resistance wire at the one end of the sensor cord to detect a pressed position in a longitudinal direction of the sensor cord based on the detected voltage.

2. The line sensor according to claim 1, wherein the two electrode wires are connected to each other at the other end of the sensor cord via a terminating resistor.

3. The line sensor according to claim 1, wherein the offset resistor has a resistance value of 10 times or more than a sum of a resistance value of the other electrode wire and a resistance value between the other end of the other electrode wire and the ground.

4. The line sensor according to claim 1, wherein the resistance wire and the detecting device are connected to each other via a buffer amplifier.

5. The line sensor according to claim 1, wherein the other one of the two electrode wires includes a conductive wire having a resistance of 0.1 Ω/m or less.

6. The line sensor according to claim 1, wherein each of the two electrode wires comprises the resistance wire having a resistance of 1 kΩ/m or more, and
   wherein the detecting device detects the voltage of the resistance wire of said each of the two electrode wires at the one end of the sensor cord to detect the pressed position in the longitudinal direction of the sensor cord based on the detected voltage of the resistance wire of said each of the two electrode wires.

7. The line sensor according to claim 6, wherein each of the resistance wire of said each of the two electrode wires comprises a tension member comprising a resin, and a conductive layer provided on an outer circumference of the tension member and comprising a conductive rubber or a conductive plastic.

\* \* \* \* \*